Figure 1:
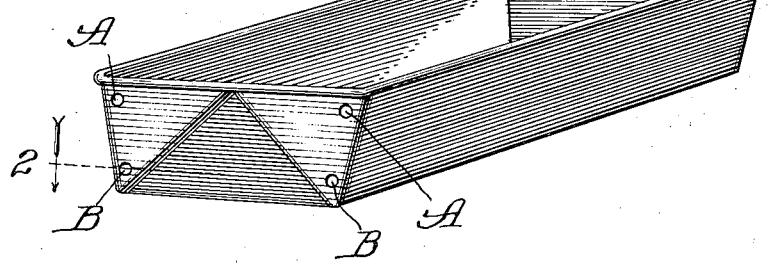

Feb. 23, 1937.   C. M. MOORE   2,071,892

BAKEPAN

Filed March 25, 1936

Inventor:
Clark M. Moore,
By Dyrenforth, Lee, Chritton & Wiles,
Attys.

Patented Feb. 23, 1937

2,071,892

UNITED STATES PATENT OFFICE 2,071,892

BAKEPAN

Clark M. Moore, Evanston, Ill., assignor to Diversey Corporation, Chicago, Ill., a corporation of Illinois Application March 25, 1936, Serial No. 70,840

5 Claims. (Cl. 53—6)

This invention relates to an improved type of baking pan, and more particularly to a bread pan particularly of the folded-end type.

Many bakery products, particularly bread, are normally baked in sheet metal pans having seamed or folded ends in which the folds are on the outside. In using such pans, the grease and foreign matter creeps up into the space between the faces of the metal in the folds and during repeated bakings, particularly starch and other organic matter, is carried up by the grease into this space and becomes carbonized. As a result, the interior of the folds quickly becomes substantially filled with a compound layer of grease and black carbonaceous material. When the pan is washed in a detergent solution, some of the solution is absorbed by the carbonaceous material and held in the folds, it being impossible to get any appreciable circulation of the cleaning solution therein. The amount of cleaning solution which does get into the folds emulsifies some of the grease and loosens the material. Then on baking, the residual water forms steam and the pressure of the gas forces some of the black, dirty grease and carbonaceous material out into the bread pan, causing a black streak to form on the corners of the bread. This difficulty is so serious that many bakeries have resorted to the insanitary practice of reusing pans without washing.

It has now been discovered that by providing a vent or drain hole in the outside metal folds, the dirty, greasy solution held within the folds drains to the outside, and the steam formed by boiling of the undrained material expands outwardly through the vent hole without forcing material inside the bread pan.

The invention is illustrated in the drawing, in which—

Figure 2:
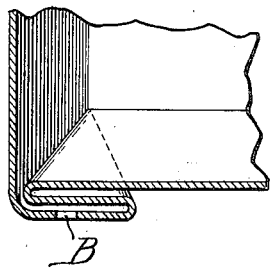

Fig. 1 represents a perspective view of a baking pan; Fig. 2 is a sectional plan view partly broken away along the lines 2 in Fig. 1; Figs. 3, 4, 5, and 6 are similar views of a modified arrangement of the vent.

Figure 3:
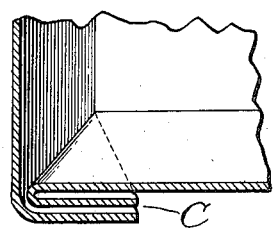
Figure 4:
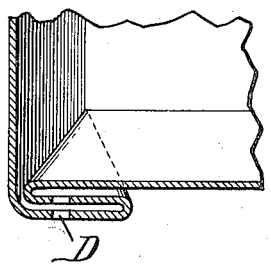
Figure 5:
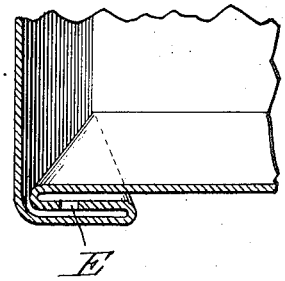

As shown in the drawing, the baking pan is made up from a single metal sheet folded to form the pan with the excess material at the corners folded over the outer sides of the ends. This arrangement produces a pan with smooth inner walls and bottom. In carrying out the invention, holes are punched into the sheet before folding, so that drain holes will result in each of the four corners of the pan in the folded material. In the modification shown in Fig. 1, an upper vent A and a lower vent B are provided in each fold. In Fig. 3 the fold is vented by cutting off the end of the fold to produce a slot C. In Fig. 4 the holes are punched through both folds of the metal, as indicated at D. In Fig. 5 the hole has been punched through only the inner surface of the fold, as indicated at E, and therefore is not noticeable on the pan.

Figure 6:
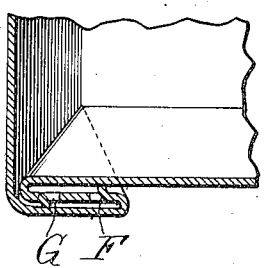

Fig. 6 shows a form in which the holes F and G are punched in such a manner as not to remove all of the metal, but to fold back a portion thereof in such a manner as to prevent the fold from entirely closing. This method insures a proper drainage channel within the fold. Obviously, other methods may be used to maintain the proper drainage channel, as the insertion of metal materials or deformation of the sheet.

While the provision of vents at the bottom of the fold is particularly important, it is also desirable to have vents near the top, because many of the pans after washing are turned upsidedown to dry.

The invention is applicable to all forms of baking pans, including the tinned metal pans customarily employed, as well as aluminum, stainless steel, or black iron and other metal material. When the pan is properly vented in this fashion any entrapped grease or dirt is forced to the outside of the pan instead of inwardly. Moreover, the provision of the vents increases to some extent the circulation of detergent material within the folds and therefore tends to decrease the amount of material entrapped therein.

The foregoing detailed description has been given for clearness of understanding only and no unnecessary limitations should be understood therefrom, but the appended claims should be construed as broadly as permissible, in view of the prior art.

I claim:

1. A sheet metal baking pan having folded outer flaps at the corners, in which the flaps are provided with a vent hole positioned and of a size adapted substantially to prevent accumulation of carbonaceous material in the flaps.

2. A sheet metal baking pan as set forth in claim 1, in which the flaps are provided with a vent hole near the bottom.

3. A baking pan as set forth in claim 1, in which a vent is in the inner wall of the flap.

4. A baking pan as set forth in claim 1, in which a vent is provided near the top and bottom of the flap.

5. A baking pan as set forth in claim 1, in which means is provided in the flap for maintaining a drainage channel to the vents.

CLARK M. MOORE.